United States Patent Office 3,210,190
Patented Oct. 5, 1965

3,210,190
PHOTOGRAPHIC LAYERS SUITABLE FOR THE SILVER DYESTUFF BLEACHING PROCESS
Walter Anderau, Aesch, Basel-Land, and Rudolf Mory, Dornach, Solothurn, Switzerland, assignors to Ciba Limited, Basel, Switzerland, a company of Switzerland
No Drawing. Filed Jan. 24, 1962, Ser. No. 168,511
Claims priority, application Switzerland, Jan. 26, 1961, 910/61
8 Claims. (Cl. 96—99)

In the substractive photographic process for the production of color transparencies and color pictures to be viewed by reflected light, a yellow component image is required, the yellow dyestuff of which absorbs light in the visible spectrum up to about 500 mμ, but allows light of higher wave-lengths to be completely transmitted. Visually, such a dyestuff is pure lemon yellow. When this yellow component image is produced by the silver dyestuff bleaching process, there are required appropriate azo-dyestuffs that are capable of being bleached. Pure yellow azo dyestuffs which conform to the optical requirements can be found among those which contain the radicals of acetoacetylaminobenzenes or of pyrazolones. These dyestuffs, however, generally have the disadvantage that they are either not bleached at all or are only partially bleached in the usual silver dyestuff bleaching process.

The present invention provides photographic layers suitable for the silver dyestuff bleaching process, which contain at least one dyestuff of the formula:

(1)               $R_1-N=N-R_2$ in which $R_1$ represents the radical of a diazo-component having a benzene nucleus bound to the azo group, and $R_2$ represents the radical of a 5-imino-pyrazoline which is bound in the 4-position to the azo group and in the 1-position to a naphthalene or benzene nucleus, and in which all the azo groups present in the molecule are bound on one side to a benzene nucleus and on the other to the radical of a 5-imino-pyrazoline. The dyestuffs to be used for the present process are of pure yellow shade and are easy to bleach out in the silver dyestuff bleaching process.

The simplest examples of such dyestuffs are monoazo-dyestuffs which are obtained by coupling a diazotized amine of the benzene series with an imino-pyrazole. If the dyes contain water-solubilizing groups, such as carboxylic acid or sulfonic acid groups, they should nevertheless be fast to diffusion, for the purposes of the silver dyestuff bleaching process, or have as low a capacity for diffusion as possible. This may be achieved by increasing the size of the dyestuff molecule, for example, by using a diazo-component whose molecule is enlarged by carboxy or sulfoxy groups. It is generally advantageous for the dyestuffs of the Formula 1 to contain in the radical $R_1$ an acyl group, for example, of the type of the benzoylamino group. Furthermore, the acyl groups may be those, for example, of higher fatty acids, such as lauric acid or palmitic acid. Furthermore, the diazo-components may, for example, correspond to the formula:

(2) 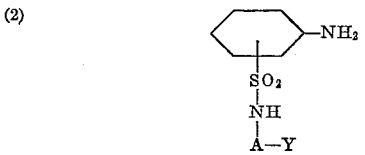

or (3) 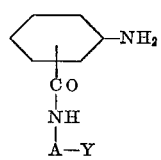

in which A represents an aliphatic or aromatic radical, and Y represents a water-solubilizing group. A diazo-component of this kind is, for example, the compound of the formula:

(4) 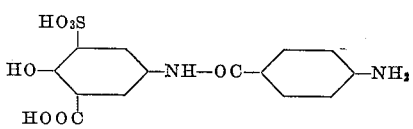

Especially suitable for the production of water-soluble dyestuffs having little or no capacity for diffusion, are diazo-components that impart substantive properties, that is to say, those which yield dyestuffs having an affinity for cellulose fibers. As examples of such diazo-components there may be mentioned:

(5) 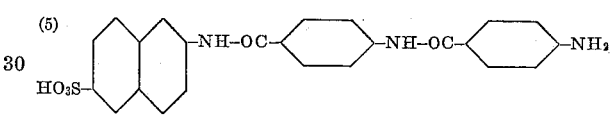

and (6) 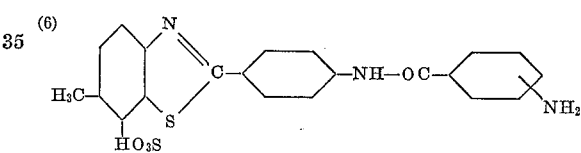

The diazo-components may, of course, contain, in addition to the aforesaid substituents and atom groupings other substituents, such as chlorine atoms or methyl, ethyl, methoxy, ethoxy, carboxylic acid amide or sulfonic acid amide groups.

The amino-pyrazolines which are coupled with the diazo-components to form monoazo-dyestuffs, are, for example, compounds of the formula:

(7) 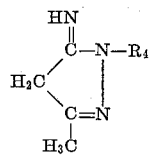

in which $R_4$ represents a naphthalene radical or preferably a benzene radical which may contain further substituents, for example, those mentioned above in connection with the diazo-components, but especially water-solubilizing groups, such as sulfonic acid groups.

Instead of monoazo-dyestuffs, the photographic layers may contain disazo-dyestuffs of the above general constitution. Such disazo-dyestuffs may, for example, correspond to the formula:

(8)
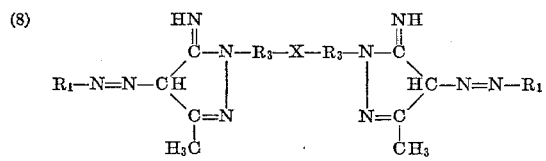

in which $R_1$ represents the radical of a diazo-component containing a benzene nucleus bound to the azo group, $R_3$ represents a benzene radical, and X represents a direct bond or a bridge member.

These disazo-dyestuffs are obtained by coupling a coupling component of the formula:

(9)
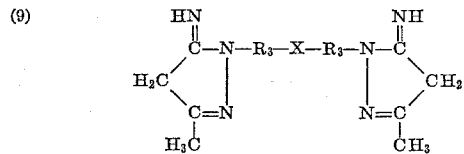

in which $R_3$ and X have the meanings given above, on both sides with a diazo-component of the benzene series, and it is also advantageous in this case to use diazo-components which are obtained from components of the type referred to above in connection with the monoazo-dyestuffs.

The benzene radicals $R_3$ may contain further substituents, and the bridge member —X— may be, for example, one of the following atomic groupings:

(a)

(b)

(c)
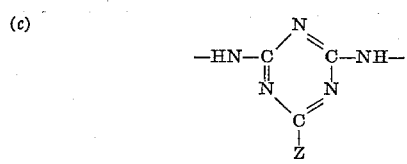

Z=a halogen atom or a hydroxyl group of an organic radical or an amino group.

(d)
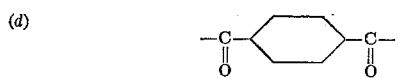

(e)
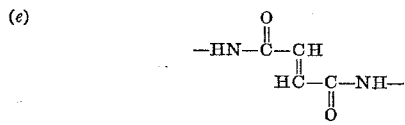

(f)                                  —CH=CH—

(g)                                  —$SO_2$—

A further group of valuable diazo-dyestuffs corresponds to the formula:

(10)
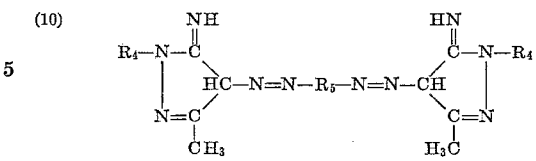

in which $R_4$ represents a naphthalene radical or preferably a benzene radical, and $R_5$ represents the radical of a tetrazo-compound.

These disazo-dyestuffs are obtainable by coupling a tetrazotized diamine with an amino-pyrazoline of the above Formula 7.

The diamines of the formula, $H_2N$—$R_5$—$NH_2$, used as starting materials may advantageously also contain groups imparting substantive properties. The following diamines may, for example, be used:

(11)
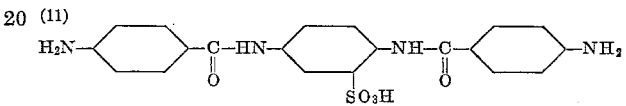

(12)
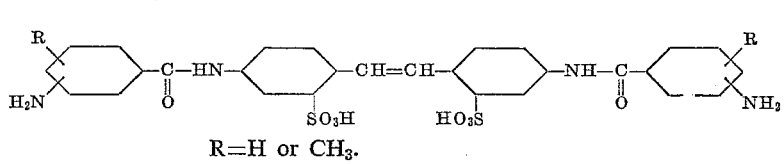

R=H or $CH_3$.

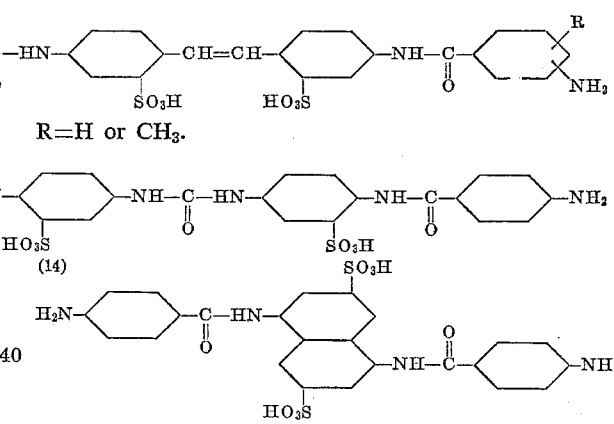

(14)

The monoazo- and disazo-dyestuffs may be prepared by methods in themselves known by coupling the diazotized monoamines or diamines in a weakly acid to weakly alkaline medium with the imino-pyrazolines capable of coupling once or twice.

When the dyestuffs contain no water-solubilizing groups, they are pigments which cannot be brought into aqueous solution and cannot be fixed to substrata like water-soluble dyestuffs, and must therefore be finely and uniformly dispersed in the photographic layers. It is necessary for this purpose to reduce them to a particle size not exceeding $0.5\mu$ by means of a suitable apparatus. The dyestuffs which contain acid water-solubilizing groups are generally obtained as the alkali metal salts thereof, and are advantageously used in that form for dyeing the photographic layers.

These dyestuffs exhibit a strong absorption in the wave-length range of 400–480 m$\mu$, a sharp fall in absorption above 480 m$\mu$ and a high degree of transparency at and above 500 m$\mu$.

The yellow dyestuffs of the constitution defined above may be used as filter dyestuffs, but especially in the construction of a multi-layer material for the production of color pictures to be viewed by reflected light or color transparencies. The water-soluble yellow dyestuffs which are capable of diffusing, can be used, for example, for coloring gelatine image layers or tanned gelatine images which are used in transfer processes or imbibition processes for building up a multi-color picture.

An important advantage of these dyestuffs is their capacity for being bleached in the silver dyestuff bleaching process. The yellow dyestuffs are especially suitable for incorporation in a multi-layer material which contains on a transparent or white pigmented support three light-sensitive silver halide gelatine layers, which are colored green-blue, blue-red and yellow, and are sensitized according to their natural color relationship.

The following examples illustrate the invention, the parts and percentages being by weight unless otherwise stated, and the relationship of parts by weight to parts by volume being the same as that of the kilogram to the liter.

*Example 1*

There is used one of the following dyestuffs, which can be prepared in the usual manner:

(15)
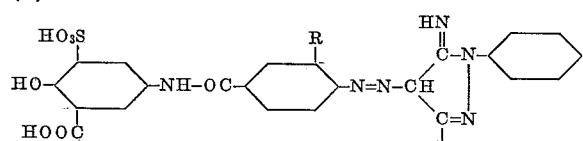
R=H or CH₃

(16)
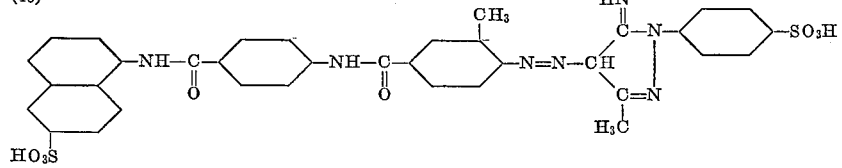

(17)
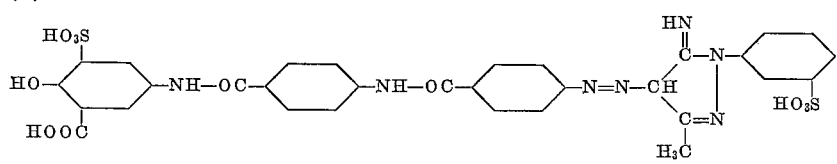

(18)
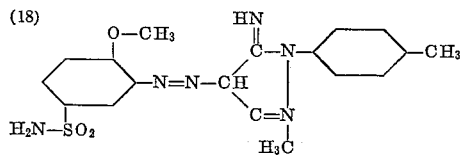

(19)
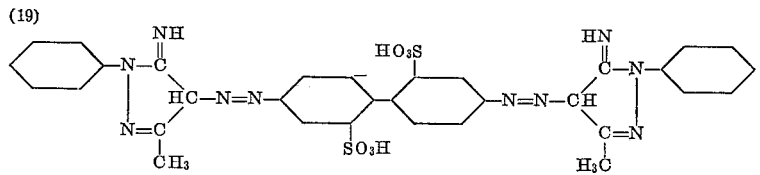

(20)
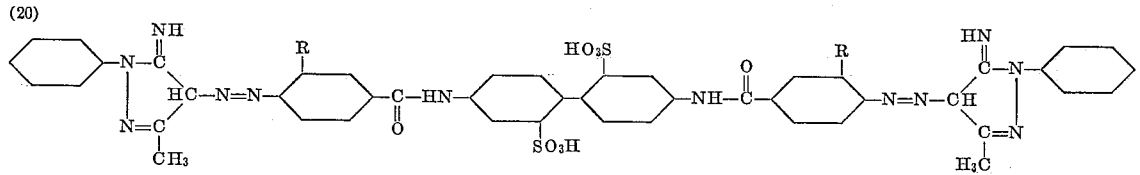
R=H or CH₃.

(21)
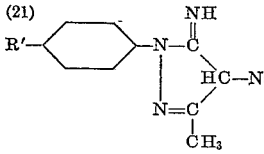
R=H or CH₃, R'=H or SO₃H.

(22)
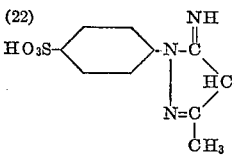
R=H or CH₃.

Gelatines colored with these dyestuffs are prepared in known manner by dissolving the dyestuff in hot water, cooling the dyestuff solution to about 40° C., and then mixing the solution with an aqueous gelatine solution of 10% strength at about 40° C. and stirring the mixture. The dissolution of the dyestuff may be facilitated by adding an alcohol, such as methanol, ethanol or glycol monomethyl ether.

By dissolving, for example, 0.041 gram of dyestuff of Formula 19 in 2.5 cc. of water, mixing the solution with 2.5 cc. of a gelatine solution of 10% strength, and casting the whole on a glass plate having an area of 1 square decimeter and then drying the layer, there is obtained a yellow layer having an optical density of 2.5 at a wavelength of 436 mμ. 500 grams of a yellow colored gelatine so obtained are mixed with 1000 grams of a silver halide emulsion containing 35 grams of silver. After casting the emulsion on the desired carrier, it is exposed, and then treated in the following manner:

(1) Developed for 5 minutes in one of the usual metol-hydroquinone-sodium carbonate developers (1000 cc.

of water containing 1 gram of N-methyl-para-aminophenol, 13 grams of anhydrous sodium sulfite, 3 grams of hydroquinone, 26 grams of anhydrous sodium carbonate and 1 gram of potassium bromide);

(2) Washed in water for 2–3 minutes;
(3) Fixed for 5 minutes in a bath containing 1000 cc. of water, 200 grams of sodium thiosulfate and 20 grams of potassium metabisulfite;
(4) Washed in water for 5 minutes;
(5) Hardened in a formaldehyde solution of 4% strength for 5 minutes;
(6) Washed in water for 5 minutes;
(7) Bleached for 10 minutes in a bath containing in 1000 parts of water, 30–90 parts of potassium bromide, 20–50 parts of thiourea, 30–75 parts of concentrated hydrochloric acid and 1–2 parts of a solution of amino-hydroxyphenazine of 0.1% strength;
(8) Washed in water for 3 minutes;
(9) Rinsed for 3 minutes in sodium carbonate solution of 10% strength;
(10) Washed in water for 3 minutes;
(11) Bleached for 5 minutes as in 7;
(12) Washed in water for 5 minutes;
(13) The silver is bleached for 3 minutes in a bath containing in 1000 parts of water, 100 parts of crystalline copper sulfate, 20 parts of 30% hydrochloric acid and 80 parts of sodium chloride;
(14) Washed in water for 3 minutes;
(15) Fixed in the bath used in 3 for 5 minutes;
(16) Washed in water for 10 minutes;
(17) Dried.

A yellow component image is obtained, which may form part of a multi-layer material, for example, as a yellow layer together with a purple layer and a cyan layer of the usual compositions.

*Example 2*

0.5 part of the dyestuff pigment of the formula

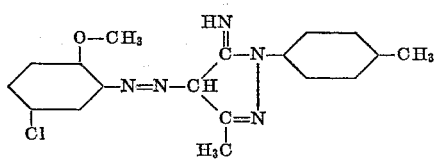

(obtainable by coupling diazotized 2-methoxy-5-chloro-1-amino-benzene with 1-(4'-methylphenyl)-3-methyl-5-iminopyrazoline) is ground with 0.5 part of a sodium alkylnaphthalene sulfonate and 20 parts of water in a ball mill which is free from metal parts, for example, in an Attritor mill (Labor model), until practically all the dyestuff has a particle size smaller than $0.5\mu$. The contents of the mill are then washed out with 30 parts of water, and homogeneously mixed with 150 parts of a gelatine solution of 8% strength. 100 parts of this colored gelatine are mixed with 50 parts of silver bromide emulsion, and the mixture is cast on glass plates. The emulsion layer is then exposed behind a stepped wedge, and the silver image is developed in a metol-hydroquinone developer, and then fixed. After hardening in dilute formaldehyde solution, the dyestuff layer is locally bleached to an extent depending on the quantity of silver locally present, in a bath containing per 1000 parts by volume, 30–75 parts by volume of hydrochloric acid of 37% strength, 30–90 parts of potassium bromide, 20–50 parts of thiourea and 0.001–0.01 part of amino-hydroxyphenazine. The excess of silver is then bleached in a bath containing, per 1000 parts by volume, 100 parts of sodium chloride, 100 of crystalline copper sulfate and 50 parts by volume of hydrochloric acid of 37% strength, and then fixed in the usual manner. A yellow dyestuff wedge is obtained which is the reverse of the original silver wedge.

The azo-pigments of the following formulae may be used instead of the azo-pigment of the Formula 23:

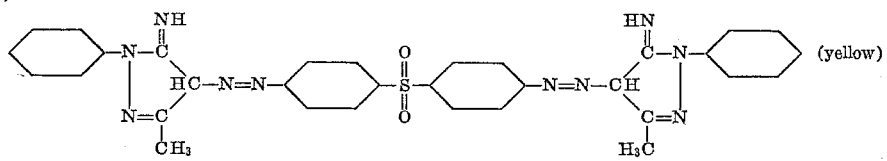

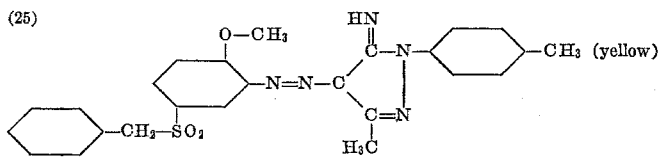

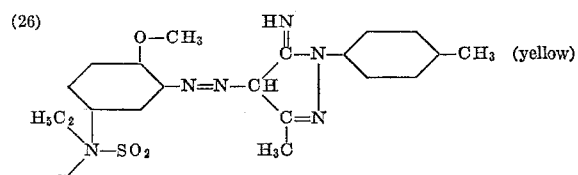

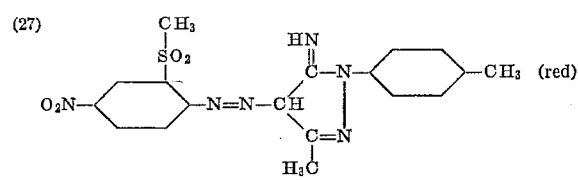

What is claimed is:
1. A photographic layer for the silver dyestuff bleaching process, which contains silver halide and at least one monoazo dyestuff corresponding to the formula

$$R_1—N=N—R_2$$

in which $R_1$ represents the radical of a diazo component having a benzene nucleus bound to the azo group, and $R_2$ represents the radical of a 5-imino-pyrazoline which is bound in the 4-position to the azo group and in the 1-position to an aromatic nucleus selected from the group consisting of a naphthalene nucleus and a benzene nucleus, and in which all the azo groups present in the molecule are bound on one side to a benzene nucleus and on the other to the residue of a 5-imino-pyrazoline.

2. A photographic layer for the silver dyestuff bleaching process, which contains silver halide and at least one dyestuff of the formula

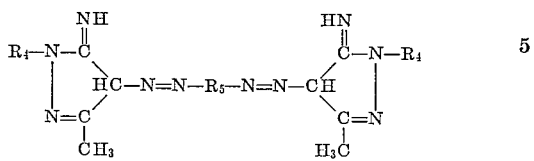

in which $R_4$ represents a benzene radical and $R_5$ represents the radical of a tetrazo compound bound to both azo groups directly by the carbon atom of a benzene ring.

3. A photographic layer for the silver dyestuff bleaching process, which contains silver halide and at least one dyestuff of the formula

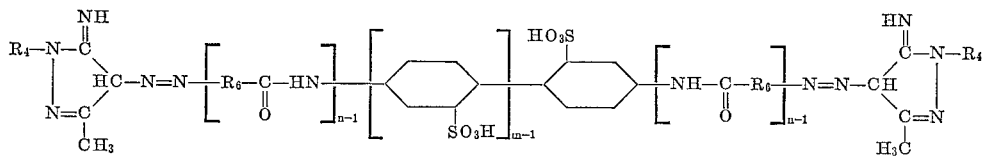

in which $R_4$ and $R_6$ represent benzene radicals and $m$ and $n$ each represents a whole number of at the most 2.

4. A photographic layer for the silver dyestuff bleaching process, which contains silver halide and the dyestuff of the formula

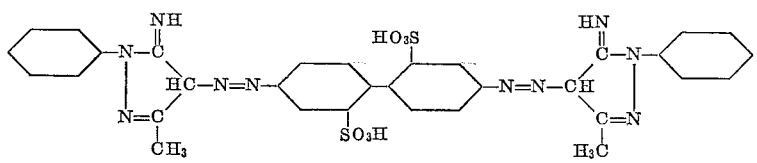

5. A photographic layer for the silver dyestuff bleaching process, which contains silver halide and the dyestuff of the formula

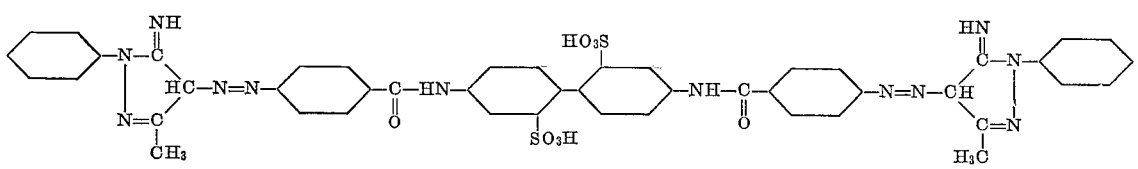

6. A photographic layer for the silver dyestuff bleaching process, which contains silver halide and the dyestuff of the formula

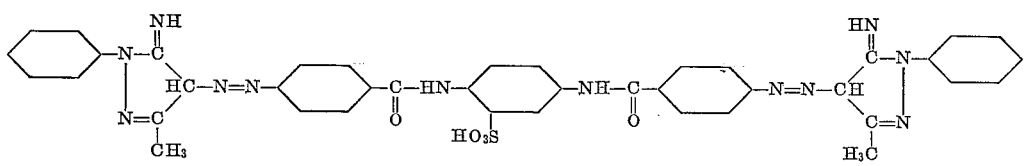

7. A photographic layer for the silver dyestuff bleaching process, which contains silver halide and at least one dyestuff of the formula

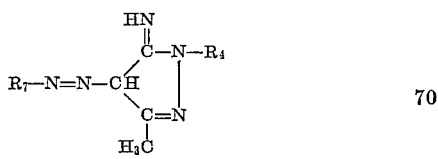

in which $R_4$ and $R_7$ each represent a monocyclic benzene radical free from water-solubilizing groups.

8. A photographic layer for the silver dyestuff bleaching process, which contains silver halide and the dyestuff of the formula

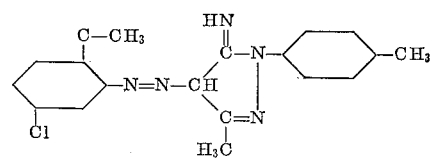

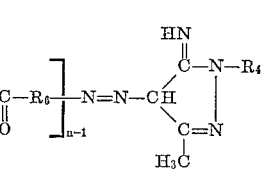

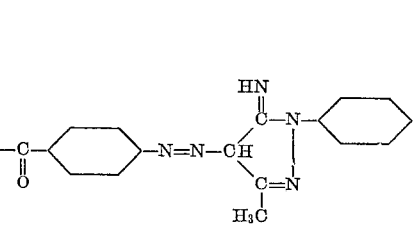

References Cited by the Examiner

UNITED STATES PATENTS 3,114,634  12/63  Brown et al. _____ 96—20

FOREIGN PATENTS 952,019  11/56  Germany.

OTHER REFERENCES

Cornwell-Clyne: "Colour Cinematography," page 420, Chapman and Hall, 37 Essex Street, London, 1951.

NORMAN G. TORCHIN, *Primary Examiner.*

LOUISE P. QUAST, *Examiner.*

UNITED STATES PATENT OFFICE
CERTIFICATE OF CORRECTION

Patent No. 3,210,190                  October 5, 1965

Walter Anderau et al.

It is hereby certified that error appears in the above numbered patent requiring correction and that the said Letters Patent should read as corrected below.

Column 10, formula in claim 8 should appear as shown below instead of as in the patent:

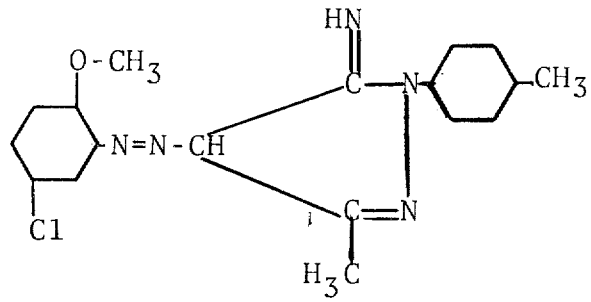

Signed and sealed this 5th day of July 1966.

(SEAL)
Attest:

ERNEST W. SWIDER                  EDWARD J. BRENNER
Attesting Officer                Commissioner of Patents